ADAPTIVE MEMORY FREQUENCY STABILIZED OSCILLATOR

Filed May 26, 1966 2 Sheets-Sheet 1

INVENTOR,
WILLIAM A. HUBER
BY Harry M. Saragovitz,
Edward J. Kelly, Herbert Berl
& Julian C. Kappler
ATTORNEYS May 16, 1967 W. A. HUBER 3,320,545
ADAPTIVE MEMORY FREQUENCY STABILIZED OSCILLATOR
Filed May 26, 1966 2 Sheets-Sheet 2

INVENTOR,
WILLIAM A. HUBER
BY Harry M. Saragovitz, Edward J. Kelly, Herbert Berl & Julian C. Keppler
ATTORNEYS

United States Patent Office 3,320,545

Patented May 16, 1967

3,320,545

ADAPTIVE MEMORY FREQUENCY STABILIZED OSCILLATOR

William A. Huber, Spring Lake, N.J., assignor to the United States of America as represented by the Secretary of the Army Filed May 26, 1966, Ser. No. 553,610
9 Claims. (Cl. 331—17)

This invention relates to frequency synchronization systems and more particularly to an adaptive memory frequency stabilization system.

In synchronous communication systems, it is necessary for signal detection that a reference signal be available at the receiver, that is, synchronized with the signaling bit rate. To effect synchronism between transmitted and local signals, phase-locked loop systems, hereinafter referred to as the PLL system, have been generally employed. Such systems usually comprise a voltage controlled oscillator (VCO), a phase detector and a memory circuit usually comprising a low-pass filter circuit having a predetermined RC time-constant characteristic. In such systems, the frequency of the local oscillator is maintained by a control voltage derived from the phase difference between transmitted and local signals. Such PLL systems do present certain disadvantages when used as highly selective, very narrow-band noise rejection filters. As an example, the time-constant of the low-pass filter is related to the memory inasmuch as the memory time is equivalent to the period of signal integration. If the time-constant of the low-pass filter circuit is increased to improve its operation on noisy signals, and also to maintain synchronization on short signal fades, it was found that because of the long time-constant, the memory will be sluggish. That is, on long signal fades where synchronization is lost, it will require an extended period to regain synchronization when the signal returns because of the slowness in the memory response. Thus, under conditions of periodic signal fades, a situation can exist where the system may never become stabilized. Also, because of its finite RC time-constant, the memory low-pass filter circuit discharges when the transmitted signal is lost so that an undesirable change is produced in the VCO frequency. Another undesirable characteristic of synchronizing systems controlled by memories with finite time-constants is that they do not maintain a constant phase relationship between the local frequency or slave signals and remote transmitter frequency or reference signals as the relative frequency stability between the two sources vary. This is so because the VCO needs varying amounts of voltage to alter its frequency, and the phase detector can only supply these voltages at the expense of phase difference. The reason for this is that the finite time-constant memory circuit acts as a peak detector, i.e., it produces an output signal proportional to the envelope of the relative phase difference between compared signals. This envelope is smoothed by utilizing a relatively long time constant.

It is an object of the present invention to provide a PLL system wherein the above noted disadvantages are overcome.

It is still another object of the present invention to provide a PLL system which includes an adaptive memory circuit wherein, when the transmitted reference signal is lost, the memory will retain its last corrected value.

It is still another object of the present invention to provide an improved PLL system which assures minimum drift of the VCO or master clock frequency thereby improving the probability that synchronization will not be lost on short term signal fades.

It is yet another object of the present invention to provide adaptive memory circuit for use in a PLL system such that phase variations are stabilized and the VCO frequency drift is minimized during the periods when input synchronization information to the PLL system is lost.

It is still another object of the invention to provide a PLL system which is characterized by short time responses under dynamic conditions, infinitely long time memory under static conditions, and adaptability to operational change.

It is yet another object of the present invention to provide a PLL system wherein the memory automatically adjusts to the correct value to maintain frequency and phase stabilization.

In accordance with the present invention there is provided an improved system for synchronizing the frequency of a local slave oscillator signal to a remote reference signal. Included are means for comparing the respective phases of the slave oscillator signal and the remote reference signal whereby an error signal is produced when the slave and reference signal are out of synchronization. Also included is a memory circuit which comprises magnetic saturable means for producing a remanent state of flux responsive to the changes in magnitude of the error signals and resulting therefrom. The net remanent flux will be varied only when there is a change in error signal, otherwise the net remanent flux will be maintained in its previous state. The magnetic saturable means is also responsive to the slave oscillator frequency whereby there is produced at the output of the memory circuit an RF signal having a magnitude proportional to the remanent flux and which is a second harmonic component of the slave oscillator frequency. Further included are means for rectifying the RF signal to produce a D.-C. voltage signal which is applied as a control voltage to the slave oscillator such that the phase difference between the slave oscillator and the remote reference signal is reduced to zero.

For a better understanding of the invention, together with other and further objects thereof, reference is had to the following description taken in connection with the accompanying drawing in which.

Figure 1:
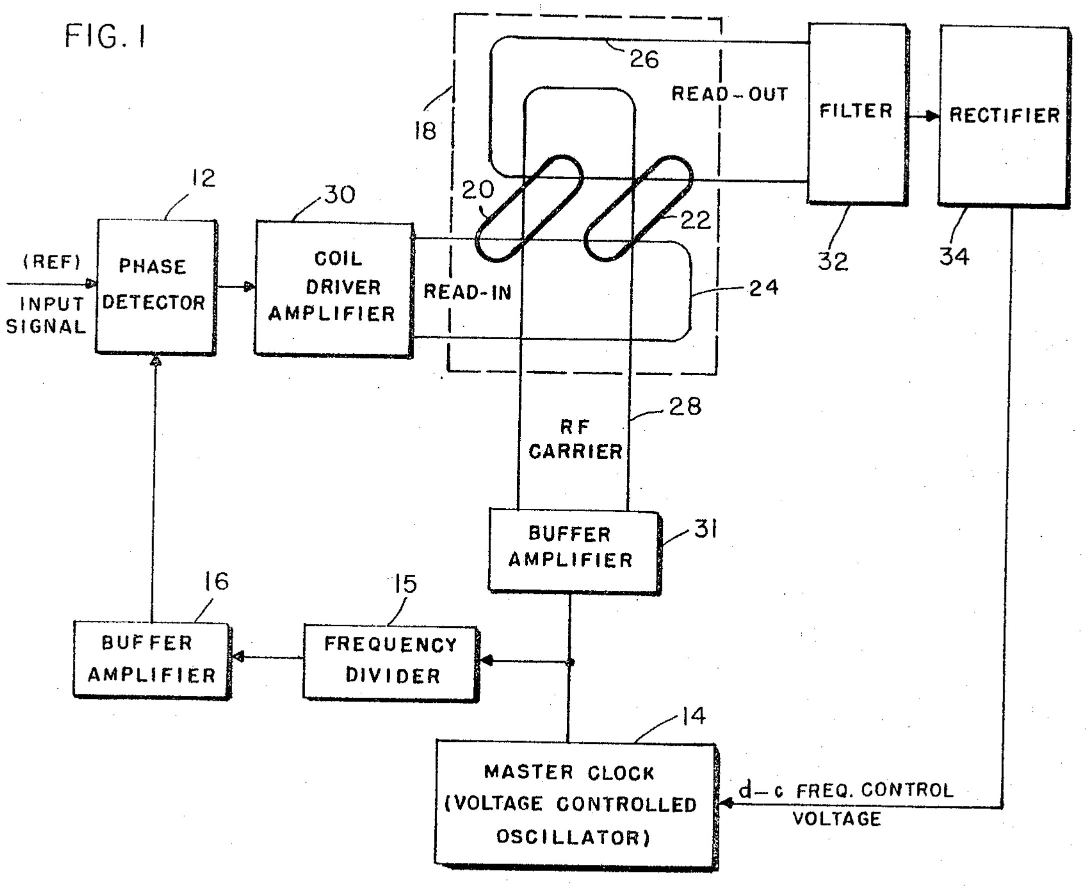
FIG. 1 is a schematic drawing of the present invention.

FIG. 1 is a block diagram of a PLL system which includes a memory circuit capable of providing rapid change under dynamic conditions and infinite memory under static conditions. Referring now to FIG. 1, there is shown at 12 a phase detector to which is applied the two signals to be compared. One input signal to phase detector 12 is derived from the remote reference source to which it is desired to synchronize. The other input signal to detector 12 is applied from master clock or slave source 14 which is to be synchronized through a divider circuit 15 and buffer amplifier 16. The memory circuit 18 includes a pair of spaced tape wound magnetic cores 20 and 22 and is adapted to store frequency and phase error information and to provide a non-destructive readout as explained below. The cores 20 and 22 are provided with three separate windings 24, 26 and 28. Winding 24, hereinafter referred to as the read-in winding, interlaces the cores in the same direction as shown and the read-in signal is derived from coil driver amplifier 30 which is adapted to amplify the error signals derived from phase detector 12. The read-in current energizes both cores 20 and 22 in the same direction. Winding 26, hereinafter referred to as the read-out winding, also interlaces the cores in the same manner as the read-in winding 24. Winding 28, hereinafter referred to as the function RF winding, interlaces both cores 20 and 22 in such a manner that the RF current in core 20 will be opposite to the RF current in core 22. The input to function RF winding 28 may be derived from any suitable RF source, but for convenience the RF output from master clock 14 is applied as the RF input to function RF coil 28 through buffer amplifier 31. As shown, the output of read-out coil 26 is passed through a filter 32 to rectifier 34 which provides a D.-C. output. The D.-C. output from rectifier 34 is fed back to master clock or slave oscillator 14 as a frequency and phase control error signal to realign the output of slave oscillator 14. For reasons explained below, RF filter 32 is adapted to pass only the second harmonic frequency component of the RF frequency applied to functional RF coil 28 through buffer amplifier 31. Rectifier 34 is responsive to the second harmonic frequency component to provide the D.-C. frequency and phase correcting voltage.

In order to better understand the invention, it would be advisable at this point to describe the principle of operation of memory circuit 18. Assuming a square loop magnetic material, it is well known that the flux density of respective tape wound cores 20 and 22 is essentially constant and the domains are oriented along the direction of the tape in either of two opposing directions. Thus the remanent state of the respective cores 20 and 22 can be defined by the net flux, which is simply the difference between the fluxes in the oppositely directed domains. Since the flux density is constant, this amounts to defining the remanent state as the difference in the domain directions through the cross section of the cores 20 and 22. The magnitude of the remanent flux is utilized as information through read-out coil 26 when an RF signal is applied to function RF coil 28. It is characteristic of this type of memory circuit that the voltage induced in the read-out coil 26 by the RF signal includes both the fundamental RF signal frequency and a second harmonic component thereof. It has been determined experimentally that the magnitude of the second harmonic component is proportional to the remanent flux while that of the fundamental RF has no apparent relationship to the value of the remanent flux. By utilizing a pair of cores 20 and 22 and with the function RF winding 28 arranged so that the RF currents in the cores 20 and 22 are in opposite directions, the fundamental RF signal will be largely attenuated in the output read-out coil 26. Additional reduction of the fundamental RF frequency is obtained by means of output filter 32 which is adapted to pass only the second harmonic component of the fundamental RF frequency. Thus the magnitude of the remanent flux will determine the magnitude of the second harmonic component of the fundamental RF frequency induced in read-out coil 26. In addition, the RF carrier signal reduces the coercive force in the cores 20 and 22 thereby reducing the amount of input power required to change the remanent flux. The memory circuit hereabove described is known in the art as a second-harmonic magnetic variable gain component which utilizes a non-destructive read-out.

Figure 2:
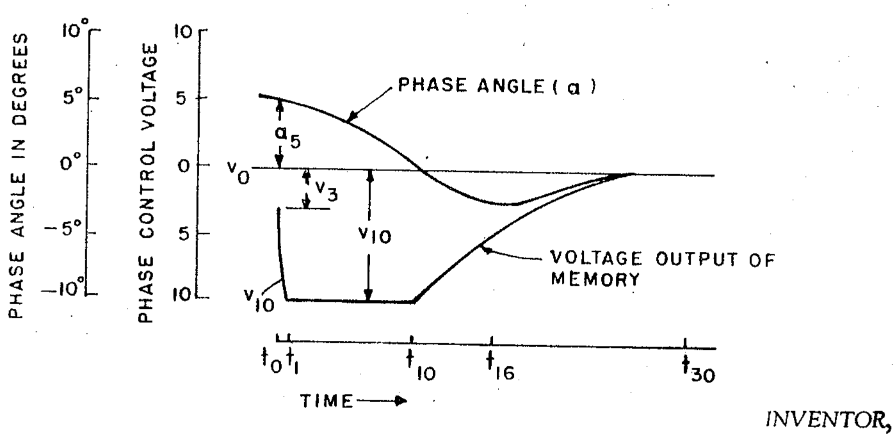
FIGS. 2, 3 and 4 illustrate a group of explanatory curves necessary for understanding the operation of the present invention.

In discussing the operation of the PLL system shown in FIG. 1, it is to be assumed that the memory circuit 18 is initially operating at the correct stabilized voltage. Memory circuit 18 will automatically stabilize the frequency of master clock 14 at the instant of system turn-on in the following manner. First, let it be assumed that initially both the reference frequency and master clock frequency 14 are identical. Under this condition, at turn-on relative phase angle between the reference and slave signals is assumed small, constant, and equal, for example, to $\alpha_5$ as shown in FIG. 2. The value of the phase angle can be assumed as constant because of an initial zero frequency difference adjustment. System transient conditions from turn-on until stabilization is reached are indicated in FIG. 2. At time $t_0$, and for a phase angle of $\alpha_5$, a voltage output $v_3$ from the memory

18 is assumed. This value will depend on the past history of the memory 18 and will have no effect on system operation after stabilization has been achieved. At system turn-on time $t_0$ the memory 18 is quickly driven to saturation voltage $v_{10}$, at time $t_1$, as the result of the phase error. During time interval $t_1$ to $t_{10}$ the phase error is gradually being reduced to zero as the result of voltage $v_{10}$ from the memory 18 being applied to the master clock 14. However, at time $t_{10}$ the output $v_{10}$ of the memory 18 is sufficient in magnitude to overcompensate for the phase correction and the phase angle reverses. This is indicated in FIG. 2 as a negative phase difference. The negative phase angle causes the voltage output of the memory 18 to decrease towards the stabilized voltage $v_0$. At time $t_{16}$ this effect is such that the direction of phase angle change is reversed towards zero. Because there is a phase angle difference during interval $t_{16}$ to $t_{30}$, the output of memory 18 is continuing to decrease. This continues to produce a phase correcting effect on the master clock VCO 14. As the phase difference approaches zero, the output of memory 18 becomes stabilized at voltage $v_0$. It can be seen that the system will always stabilize at a memory output of $v_0$ regardless of the value of the initial phase angle and memory 18 output. This is so because the only correction being effected is that of phase since the frequency of the two comparing sources has been assumed identical. Of course, with time these frequency sources will tend to drift with respect to each other. When this occurs it will be necessary to generate a compensating voltage for application to the master clock VCO 14 in order to maintain synchronization. This condition will require a change in the value of $v_0$. It is the ability of the system to automatically generate this new voltage that supplies the adaptive characteristics.

Figure 3:
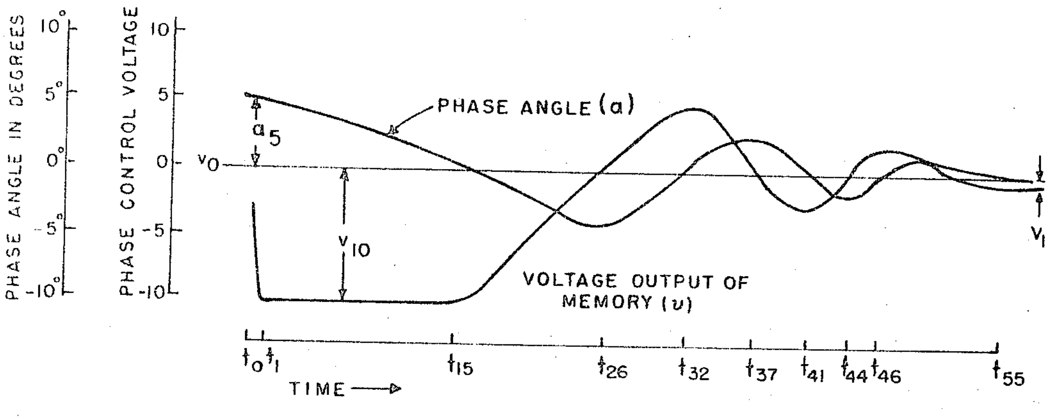

In the above example, it was assumed that when the system was first turned on, the frequency of the reference and slave signals were identical. Consider now the synchronizing characteristics when a difference in frequency is assumed as indicated in FIG. 3. The difference in frequency will cause a changing phase, which will be assumed as increasing, and at time $t_0$, equal to $\alpha_5$. As before, initially the memory 18 becomes saturated in the direction so as to reduce the phase angle towards zero. In this instance, it will take a little longer to reduce the phase angle to zero because of the additional requirement for frequency correction. However, the phase angle is eventually reduced to zero at time $t_{15}$ and overcompensation follows as before. In this case, the frequency difference has the effect of increasing the inertia of the PLL system so the phase angle change lags behind the output of the memory by a greater time interval than was the case for the identical frequency condition. This is indicated in FIG. 3 where the voltage of the memory has been reduced to $v_0$ at time $t_{26}$ and a negative phase angle still exists. This negative phase angle will cause the output of the memory 18 to reverse, which in turn will cause overcompensation of phase correction this time in the positive direction. Again the output of the memory 18 will be such as to reduce the phase angle towards zero. At time $t_{41}$ overcompensation of phase angle correction has again occurred. It will be noted that each overshoot of the phase compensation is progressively less, and during time interval $t_{46}$ to $t_{55}$ the phase angle is reduced to zero. The voltage necessary to maintain this zero phase angle is no longer $v_0$ but $v_1$. This is the adaptive voltage change that is necessary to compensate for the initially assumed frequency difference.

Figure 4:
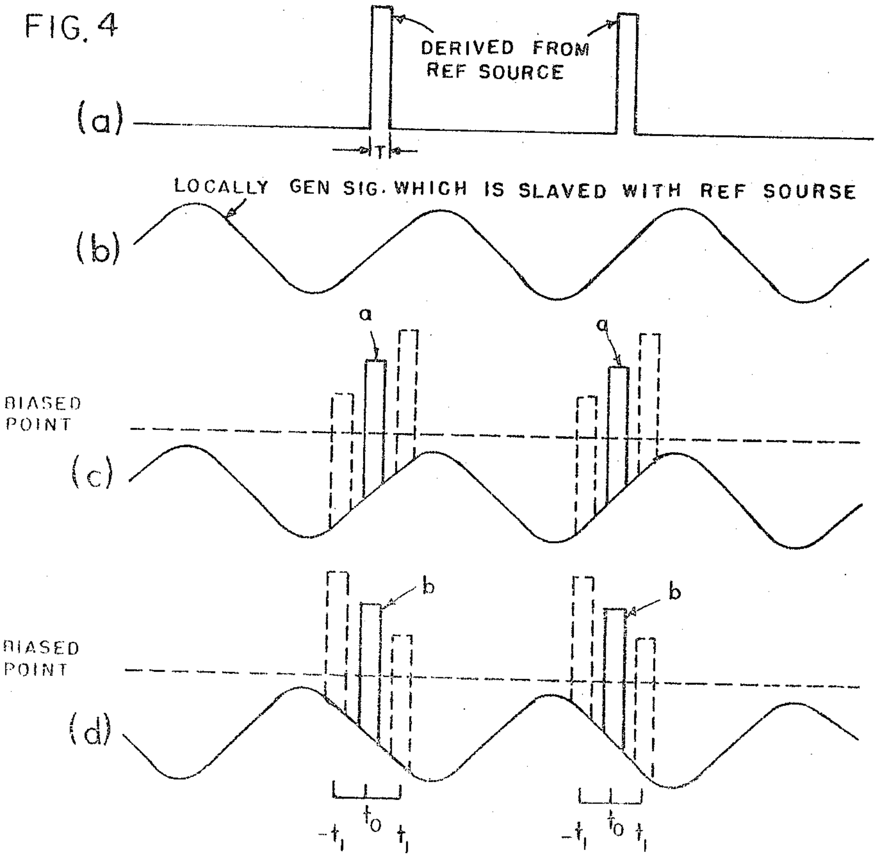

With the above described memory stabilization technique, the operation of the PLL system may be discussed with reference to FIGS. 1 and 4. FIG. 4A shows the signal derived from the remote or reference source which is to be compared with the output of master clock oscillator or VCO 14. It is to be assumed that phase detector 12 has a push-pull input so that an output is derived therefrom only when both inputs differ in magnitude. FIG.

4B illustrates the locally generated clock oscillator (slave) signal after being divided down through frequency divider 15 to effect a 1 to 1 frequency relationship with that of the reference signal or an integral multiple thereof. The respective signals appearing at the inputs to phase detector 12 are shown in FIGS. 4C and 4D which show the composite signals. The composite signals are biased so that the sine wave portion of the waveform derived from the frequency divider 15 has no effect on the phase detector 12. Assuming that for normal locked-loop operation the phase relationship between 4A and 4B is that shown at $t_0$ (solid line), then in this condition there is zero output from the phase detector 12 since both magnitudes of the phase detector input signals are equal. If there is a phase change between the reference and slave signals as indicated at time $t_1$, then the amplitude of waveform 4C will increase while the amplitude of waveform 4D will decrease. This will cause a resultant current to flow in one direction in read-in coil winding 24. If the phase change between the reference and slave signals is in the opposite direction as indicated at $-t_1$, then the current flow in read-in winding 24 will be in the opposite direction. Thus, the flux in magnetic memory cores 20 and 22 will be varied in accordance with the relative phase changes between the slave and reference signals applied to phase detector 12. A voltage proportional to the remanent flux in the cores 20 and 22 is obtained in the read-out winding 26 due to the RF voltage applied to function RF winding 28 from the master clock oscillator 14. As hereinabove explained, the second harmonic component of the master clock oscillator 14 frequency derived from memory circuit 18 has a magnitude proportional to the remanent flux. This magnitude of the second harmonic component is passed through filter 32 to rectifier 34. Thus, the D.-C. voltage derived from rectifier 34 is proportional to the phase between the input signals applied to phase detector 12. As shown, the D.-C. voltage is applied to master clock oscillator 14 as a frequency and phase control voltage to provide a frequency change in a direction so as to stabilize the locked-loop in phase position $t_0$ of FIG. 4. It can be seen that the voltage from memory cores 20 and 22 will be a maximum when all the flux is oriented in the sam direction. If some of the flux in memory cores 20 and 22 is reversed in direction by the current in read-in winding 24, the read-out voltage from read-out winding 26 will decrease, eventually becoming zero for equally opposing flux conditions. As the flux state is increased in the opposite direction, the read-out voltage from read-out winding 26 will again increase in proportion to the flux change, but its phase will be reversed. In the instant invention, the phase reversal is not utilized. Cores 20 and 22 are operated so that one-half the maximum voltage read-out is obtained when the system is synchronized at the locked-phase condition. This operating point allows for ample memory capacity to take care of plus or minus frequency drifts. If, when once synchronized, there should occur a frequency change, then the resultant phase changes will vary the remanent flux in cores 20 and 22 accordingly as explained above. This phase change of course will provide a D.-C. read-out voltage which is utilized to control master clock oscillator 14 so as to reduce the frequency difference between the two signals to zero.

With the arrangement hereinabove described the read-in into cores 20 and 22 is at the reference signaling rate. That is, the phase relationship between the slave and reference source is sampled at the reference signaling rate and the memory cores 20 and 22 are capable of accepting information at this rate. Thus, under dynamic conditions, the memory cores are capable of recording any pertinent phase change. Also, it can be seen from FIGS. 4C and 4D that if the reference signal should be lost, such as commonly occurs if it is being transmitted via RF propagation, then the output of phase detector 12 will be zero and no change will be made in the remanent flux in cores 20 and 22. However, the remanent flux will remain as the controlling factor in maintaining the frequency and phase of master clock oscillator 14 in accordance with the very last data that was received from the reference source. Thus the read-out characteristic cannot be destroyed and the cores 20 and 22 will provide infinite memory under static conditions.

While there has been described what is at present considered to be the preferred embodiment of this invention, it will be obvious to those skilled in the art that various changes and modifications may be made therein without departing from the invention, and it is therefore aimed in the appended claims to cover all such changes and modifications as fall within the true spirit and scope of the invention.

What is claimed is:

1. A system for synchronizing the frequency and phase of a local slave oscillator RF signal to a remote reference signal comprising, means for comparing the respective phases of said slave oscillator signal and said remote reference signal whereby an error signal is produced when said slave signal and said reference signal are out of synchronism, a memory circuit including magnetic saturable means for producing a remanent state of flux responsive to the changes in magnitude of said error signals and resulting therefrom, said magnetic saturable means being responsive to said slave oscillator frequency whereby there is produced an RF signal having a magnitude proportional to said remanent flux, and means for rectifying said last mentioned signal to produce a D.-C. voltage signal, said D.-C. voltage signal being applied as an adaptive voltage to control the output frequency of said slave oscillator such that the phase difference between said slave oscillator signal and said remote reference signal is reduced to zero.

2. The system in accordance with claim 1 wherein said magnetic saturable means includes at least one tape wound magnetic core characterized by an essentially constant flux density and the flux domains oriented along the direction of the tape in either of two opposing directions.

3. The system in accordance with claim 1 wherein the RF signal output of said magnetic saturable means is a second harmonic component of said slave oscillator frequency having a magnitude proportional to said remanent flux.

4. The system in accordance with claim 1 and further including a frequency divider circuit responsive to said slave oscillator frequency for producing a signal having a frequency equal to an integral multiple of the frequency of said remote reference signal, said divided frequency signal being applied as one input to said phase comparison means.

5. The system in accordance with claim 3 wherein said magnetic saturable means includes a pair of tape wound magnetic cores responsive to said error signal for producing a net remanent flux which is the difference between the fluxes in the oppositely directed domains.

6. The system in accordance with claim 5 and further including an RF filter adapted to pass only said second harmonic component.

7. The system in accordance with claim 5 wherein said cores are interlaced by a read-in winding, a read-out winding and a function RF winding, respectively, said read-in winding being responsive to the error signal output of said phase comparison means, said function RF winding being responsive to the output frequency of said slave oscillator, the second harmonic component of said slave oscillator frequency being induced in said read-out coil by the application of said slave oscillator frequency to said function RF winding.

8. A system for synchronizing the frequency and phase of a local slave oscillator signal to a remote reference signal comprising, means for comparing the respective phases of said slave oscillator signal and said remote reference signal whereby an error signal is produced when said slave signal and said reference signals are out of synchronism, a memory circuit including a pair of tape wound magnetic cores responsive to the changes of said error signals for producing a remanent flux, said tape magnetic cores being responsive also to said slave oscillator frequency whereby there is produced at the output of said memory circuit a second harmonic component of said oscillator frequency signal having a magnitude proportional to the magnitude of said remanent flux, means for rectifying said second harmonic component to produce a D.-C. voltage, said D.-C. voltage being applied as an adaptive frequency correction voltage to said slave oscillator such that the phase difference between said slave oscillator and said remote reference signal is reduced to zero.

9. The system in accordance with claim 8 and further including a frequency divider circuit responsive to said slave oscillator frequency for producing a signal having a frequency equal to the frequency of said remote reference signal, said divided frequency signal being applied as one input to said phase comparison means.

No references cited.

ROY LAKE, *Primary Examiner.*

JOHN KOMINSKI, *Examiner.*